(12) United States Patent
McEvoy et al.

(10) Patent No.: US 8,247,778 B2
(45) Date of Patent: Aug. 21, 2012

(54) SCINTILLATOR ARRAYS AND METHODS OF MAKING THE SAME

(75) Inventors: Kevin Paul McEvoy, Ballston Spa, NY (US); James Wilson Rose, Guilderland, NY (US); Andrea Jeanne Howard, Albany, NY (US); Michael James Palleschi, Clifton Park, NY (US); Jonathan David Short, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/826,808

(22) Filed: Jun. 30, 2010

(65) Prior Publication Data

US 2012/0001078 A1 Jan. 5, 2012

(51) Int. Cl.
*G01T 1/20* (2006.01)
*G01T 1/00* (2006.01)

(52) U.S. Cl. .................. 250/367; 250/483.1; 250/486.1

(58) Field of Classification Search .................. 250/366, 250/367, 368, 370.11, 483.1, 486.1, 487.1
See application file for complete search history.

(56) References Cited

U.S. PATENT DOCUMENTS

| | | | |
|---|---|---|---|
| 6,495,845 B1 * | 12/2002 | Tsunota et al. | 250/505.1 |
| 6,556,602 B2 | 4/2003 | Rice et al. | |
| 7,164,134 B2 | 1/2007 | Wei et al. | |
| 7,308,074 B2 | 12/2007 | Jiang et al. | |
| 7,384,158 B2 | 6/2008 | Ramachandran et al. | |

* cited by examiner

*Primary Examiner* — David Porta
*Assistant Examiner* — Faye Boosalis
(74) *Attorney, Agent, or Firm* — Scott J. Asmus

(57) ABSTRACT

A scintillator array and method for making the same are provided. The array comprises a bi-layer reflector further comprising a conformal smoothing layer and a mirror layer. The bi-layer reflector does not comprise an intervening reducing agent or adhesion layer and/or comprises aluminum. Further, the mirror layer may be deposited via gas phase metallization, allowing application to tightly confined spaces. A detector array comprising the scintillator array is also provided.

23 Claims, 5 Drawing Sheets

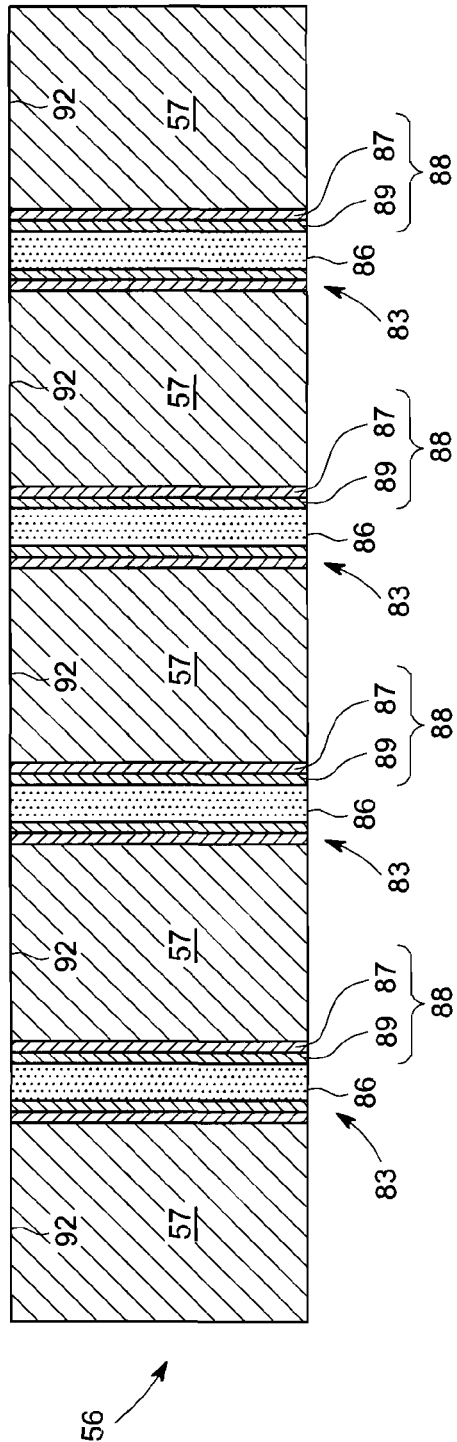
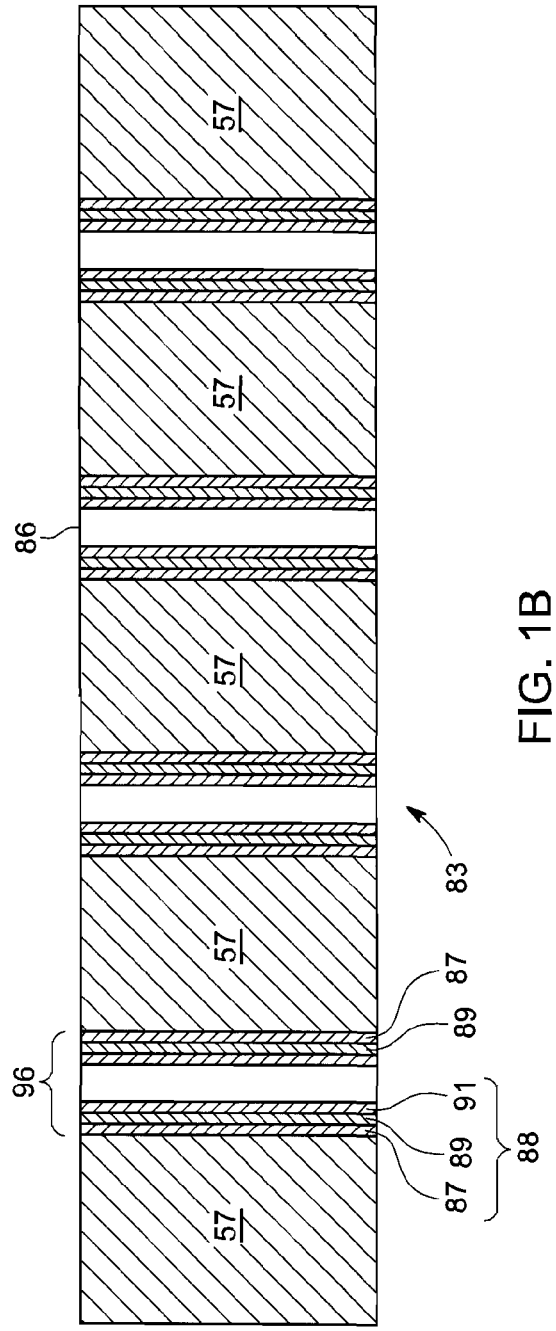
FIG. 1A
FIG. 1B

SCINTILLATOR ARRAYS AND METHODS OF MAKING THE SAME

BACKGROUND

The embodiments disclosed relate generally to solid state X-ray detectors, and more specifically to high performance CT reflectors for scintillator arrays and methods of making the same.

In computed tomography (CT) imaging systems, an x-ray source and a detector array are rotated about a gantry within an imaging plane and around the subject. The x-ray source, typically x-ray tubes, emits a fan-shaped beam toward a subject or object, such as a patient or piece of luggage. The beam, after being attenuated by the subject, impinges upon an array of radiation detectors.

X-ray detectors typically include a collimator for collimating x-ray beams received at the detector, a scintillator array, and photodiodes. In operation, each scintillator of a scintillator array converts x-rays to light energy, which each scintillator then discharges to the photodiode adjacent thereto. Each photodiode detects the light energy provided and generates a corresponding electrical signal. The outputs of the photodiodes are then transmitted to the data processing system for image reconstruction.

BRIEF DESCRIPTION

There is provided a scintillator array having a plurality of scintillators comprising at least two bi-layer reflectors interstitially disposed between at least two adjacent scintillators. The bi-layer reflectors comprise a conformal smoothing layer and a mirror layer, wherein the mirror layer comprises aluminum.

In another aspect, there is provided a scintillator array having a plurality of scintillators comprising at least two bi-layer reflectors interstitially disposed between at least two adjacent scintillators. The bi-layer reflectors comprise a conformal smoothing layer and a mirror layer, and wherein the bi-layer reflectors do not comprise an intervening reducing agent or adhesion layer.

In another aspect, a method of forming a bi-layer reflector on a plurality of 3D scintillators is provided. The method comprises applying a conformal smoothing layer to the 3D scintillators and applying a reflective layer directly to the conformal smoothing layer.

A detector array is also provided. The detector array comprises a scintillator array and a plurality of detectors. The scintillator array comprises a plurality of scintillators comprising at least two bi-layer reflectors interstitially disposed between at least two adjacent scintillators. The bi-layer reflectors comprise a conformal smoothing layer and a mirror layer, wherein the mirror layer comprises aluminum.

BRIEF DESCRIPTION OF THE DRAWINGS

These and other features, aspects, and advantages of the present invention will become even better understood when the following detailed description is read with reference to the accompanying drawings in which like characters represent like parts throughout the drawings, wherein:

FIG. 1A is a schematic representation of a side view of a portion of a scintillator array in accordance with one embodiment;

FIG. 1B is a schematic representation of a side view of a portion of a scintillator array in accordance with one embodiment;

DETAILED DESCRIPTION

Figure 2A:
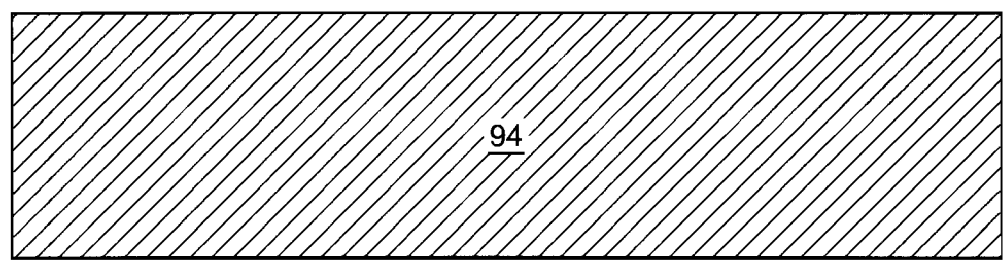
FIG. 2A-2E are a schematic representation of a side view of a portion of a scintillator array as it flows through one embodiment of the method.
Figure 2B:
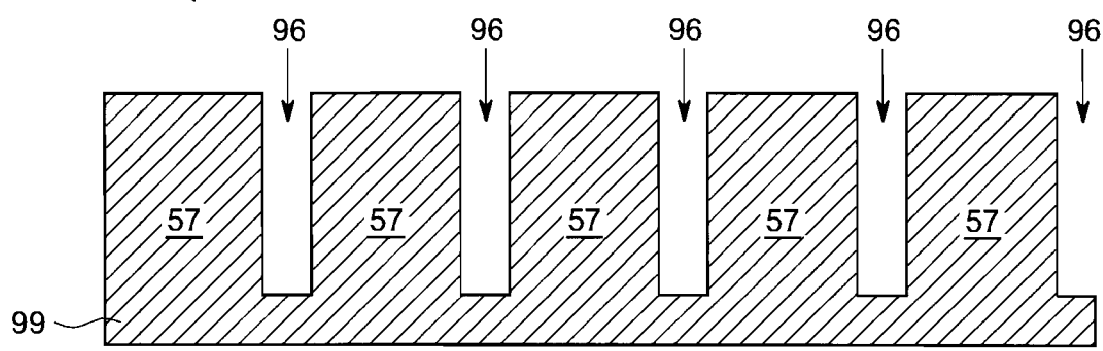
Figure 2C:
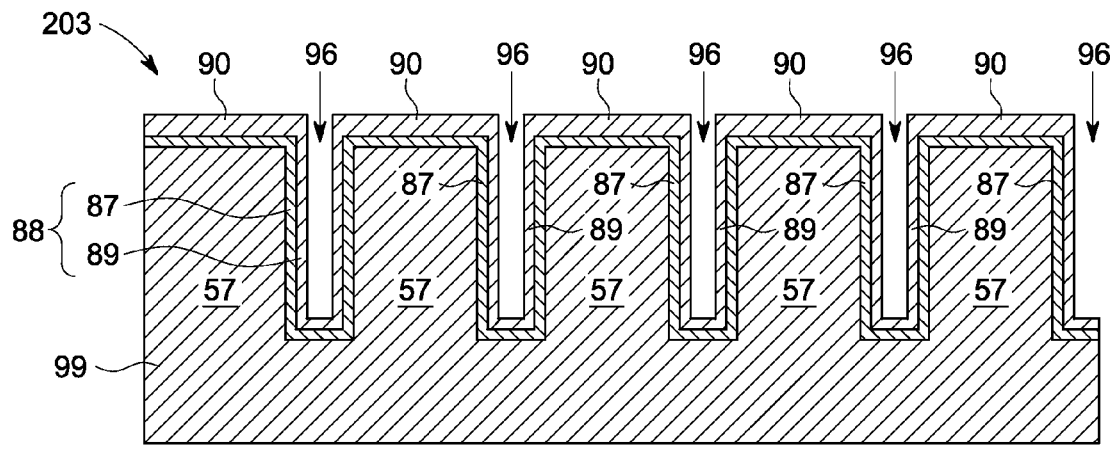
Figure 2D:
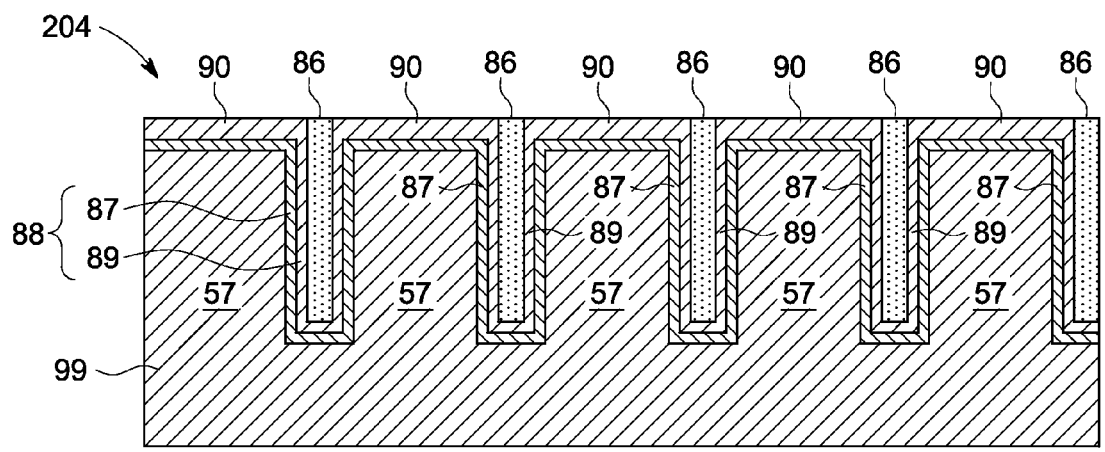
Figure 2E:
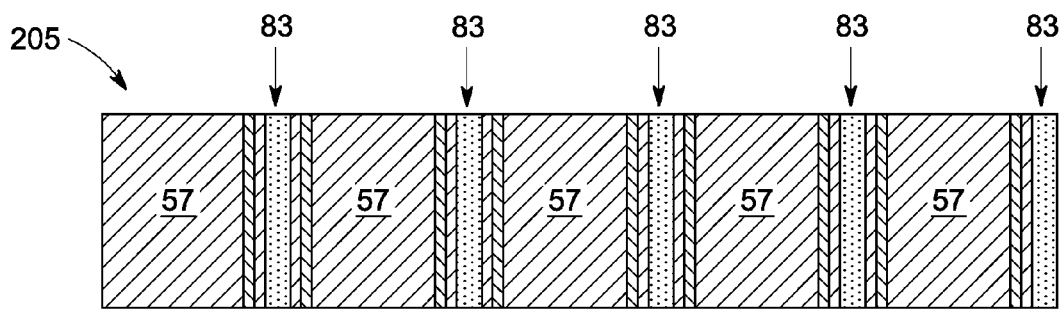

The above brief description sets forth features of the various embodiments of the present invention in order that the detailed description that follows may be better understood, and in order that the present contributions to the art may be better appreciated. There are, of course, other features of the invention that will be described hereinafter and which will be for the subject matter of the appended claims.

In this respect, before explaining several embodiments of the invention in detail, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The terms "first," "second," and the like, as used herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). The suffix "(s)" as used herein is intended to include both the singular and the plural of the term that it modifies, thereby including one or more of that term.

Reference throughout the specification to "one embodiment" or "an embodiment" means that a particular feature, structure, or characteristic described in connection with an embodiment is included in at least one embodiment. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Referring now to FIG. 1A, a cross-section of a portion of a scintillator array according to one embodiment is shown. Scintillator array 56 includes a plurality of uniformly spaced scintillators 57. Interstitially spaced or disposed between adjacent scintillators 57 is reflecting unit 83. The reflecting unit 83 is designed to maintain a relatively high light output for each scintillator 57 as well as prevent light and x-ray cross-talk between scintillators 57. Each reflecting unit 83 comprises at least two bi-layer reflectors 88. In some embodiments, such as in the embodiment shown in FIG. 1, the reflecting unit further comprises a composite layer 86 sandwiched between a pair of bi-layer reflectors 88.

Scintillators 57 may be formed from a wide variety of scintillator materials well known to those of ordinary skill in the art. Such materials include medical imaging scintillators made of rare earth oxides or gadolinium oxysulfide, as well as single crystals of cesium oxide, bismuth germinate or lutetium silicate. In addition, scintillators used primarily in physics research such as lead tungstate and sodium iodide are also applicable. One commercially available scintillator is HiLite®, available from General Electric Medical Systems.

Alternatively, the material used in scintillators 57 may be formed of transparent rare earth garnet ceramic material having the formula $(G_{1-x-y}A_xRe_y)_wD_zO_{12}$ where G is a metal selected from the group consisting of Tb and Lu; A is a rare earth metal selected from the group of Y, La, Gd, Lu and Yb when G is Tb; A is a rare earth metal selected from the group consisting of Y, La, Gd, Tb and Yb when G is Lu; Re is at least one rare earth metal selected from the group consisting of Ce, Pr, Nd, Sm, Eu, Dy, Ho, Er, and Tm; D is a metal selected from the group consisting of Al, Ga, and In; w is a range of from about 2.8 to about 3.1%; x is a range of from about 0 to about 0.5%; y is a range of from about 0.0005 up to about 0.2% and z is a range of from about 4 to about 5.1%. Two specific examples of ceramic garnets according to this formula suitable for use in scintillators 57 include terbium aluminum garnet ("TAG", $Tb_{2.992}Ce_{0.012}Al_{4.996}O_{12}$) and terbium lutetium aluminum garnet ("LuTAG", $Tb_{2.198}Lu_{0.8}Ce_{0.01}Al_{4.992}O_{12}$).

In the case of single crystal scintillator materials such as cesium iodide (CsI), the crystals are oriented perpendicular to the plane of the glass substrate panel (not shown) and they act as short optical fibers to ensure that light photons originating in the crystals exit at its ends of the crystals and into its amorphous silicon array (not shown), rather than propagating within the CsI layer.

Each reflecting unit 83 comprises at least two bi-layer reflectors 88. More particularly, each bi-layer reflector 88 comprises a smoothing layer 87, adjacent to scintillator 57 and a mirror layer 89 overlying smoothing layer 87. Smoothing layer 87 reduces, e.g., as by filling in, the surface roughness of surfaces of scintillator 57 within gaps 96. The decreased roughness affects the subsequently applied mirror layer 89. The increased smoothness of mirror layer 89, in turn, can result in higher reflectance by mirror layer 89.

Smoothing layer 87 may comprise any low viscosity polymeric material, or any polymeric inorganic material or combination of materials that exhibits the desired performance characteristics in terms of optical (refractive index and absorption) and physical properties (thermal stability). Desirably, smoothing layer 87 is substantially transparent in the emissions wavelength of scintillators 57. Suitable examples of such materials include, but are not limited to, silicone hardcoats, styrene acrylate coatings, ultraviolet curable hardcoats, polyvinylidene chloride, epoxy silane hardcoats, or combinations of these. In some embodiments, the smoothing layer 87 comprises an epoxy-silane hardcoat.

Smoothing layer 87 can be applied using any known process for applying a thin film, and may, for example, be applied using a wet chemistry method, such as a solution flow coating process or a spin coating process. In some embodiments, smoothing layer 87 has a thickness of from about 0.1 to about 5 microns, or from about 0.5 microns to about 3 microns.

In some embodiments, mirror layer 89 is directly applied to smoothing layer 87, i.e., with no intervening reducing agent or adhesion layer. Mirror layer 89 desirably comprises materials that have high reflectivity at the wavelengths of light emitted by scintillators 57. For example, ultraviolet-light emitting scintillators 57 would require a material that reflects ultraviolet light, such as aluminum. For scintillators 57 that emit red or infrared light, gold metallic layers are desirable since gold exhibits high reflectivity in those spectral regions. Other materials that may be used in mirror layer 89 include silver, copper, rhodium and magnesium. In some embodiments, mirror layer 89 comprises aluminum. In some embodiments, mirror layer comprises aluminum metal. In such embodiments, the aluminum metal may desirably provide a minimum of 90% reflectivity in the range of from about 500 nm to about 70 nm. Furthermore, the use of aluminum metal can be advantageous in that it can reduce or eliminate the decrease in reflectivity that can be seen upon aging exhibited by some materials conventionally used in mirror layers, e.g., silver. In some embodiments, an adhesion layer comprising, e.g., titanium, tungsten, chromium and/or zirconium, may be used, if desired, or required.

The mirror layer 89 is applied to a thickness of at least about 0.1 microns to about 5 microns, or from about 0.5 microns to about 3 microns, by techniques well known to those of ordinary skill in the art. The chosen method may depend, to some extent, on the composition of the mirror layer. Desirably, the mirror layer is applied using a non-line of sight process, such as, for example, chemical vapor deposition, physical vapor deposition, sputtering, via chemical reduction from a liquid phase or gas phase metallization. In some embodiments, mirror layer 89 may be applied using gas phase metallization.

In some embodiments, such as in the embodiment shown in FIG. 1, the reflecting unit further comprises a composite layer 86 sandwiched between a pair of bi-layer reflectors 88. Composite layers 86 are designed to absorb light that is transmitted from one scintillator to an adjacent scintillator, thereby reducing, or even eliminating optical cross-talk between scintillators. Composite layers may additionally be configured to absorb x-ray photons translating between scintillators.

Composite layers 86 may comprise a low viscosity polymer. Any of a number of low viscosity commercially available epoxies, such as polyurethane, may be used in composite layer 86. In some embodiments, the low viscosity polymer exhibits a relatively high resistance to radiation. Composite layer 86 may have a thickness of from about 50 microns to about 100 microns. In contrast, each bi-layer reflector 88 desirably has a thickness of from about 15 microns to about 50 microns.

FIG. 1B shows an additional embodiment of the invention, wherein reflectors 88 may additionally comprise a passivation layer 91. Passivation layer 91 may comprise, e.g., UV hardcoats, styrene acrylate coatings, oligomer coatings, amorphous Teflon coatings or combinations of these. That, is, although one passivation layer is shown in FIG. 1B, multiple passivation layers 91 may be utilized, if desired. Passivation layer 91 may be applied by any known suitable process and at any desired thickness, but typically will be applied at a thickness of from about 0.1 to about 5 microns.

Referring now to FIG. 2, stages of a method in accordance with one embodiment will be described in greater detail. Stage 201 of the manufacturing technique begins with the formation of a scintillator substrate 94. The scintillator substrate 94 comprises of one or more materials designed to illuminate and output light upon the reception of x-rays or other radiographic imaging energy. The substrate 94 may be fabricated in accordance with one of a number of well-known semiconductor fabrication techniques. Stage 201 further includes grinding of the bulk substrate material into a wafer having a desired thickness as well as grinding or other processes to dimensionally define the substrate.

In stage 202 of the method, the substrate 94 undergoes one of a number of pixelating processes to define a number of scintillators 57 in the substrate 94. For example, the substrate 94 may be diced using a wire saw dicer or other dicing mechanism. Additionally, the individual scintillators 57 may be defined using ion beam milling, chemical etching, vapor deposition, or any of other well-known substrate cutting techniques. Preferably, the individual scintillators 57 are defined such that a gap 96 is formed between adjacent scintillators. Additionally, the scintillators 57 are preferably defined three-dimensionally across the scintillator substrate 94. Preferably, gaps 96 extend between individual scintillators 57 in both the x and z directions and have a width of approximately 100 to 200 microns depending on efficiency requirements. The depth of the gaps 96 depends on the stopping power desired and varies according to scintillator substrate composition.

Following formation or definition of the individual scintillators 57, bi-layer reflectors 88 are cast onto scintillators 57 and into gaps 96 in Stage 203. More particularly, smoothing layer 87 may first be applied to gaps 96, via a wet chemistry method, such as a solution flow coating process or a spin coating process. In some embodiments, smoothing layer 87 has a thickness of from about 0.5 to 5 microns. The desired mirror layer 89 is then applied using a non-line of sight process, such as, for example, chemical vapor deposition, physical vapor deposition, sputtering, via chemical reduction from a liquid phase or gas phase metallization. In some embodiments, mirror layer 89 may be applied using gas phase metallization. At the completion of Stage 203, gaps 96 remain.

Smoothing layer 87 and/or mirror layer 89 may be cured, if desired or required, prior to application of the adjacent layer, or next processing step. After any such desired curing, the top surface or portion of the scintillator array is machined to leave a top reflective layer 90 that has a desired thickness, e.g., of from about 100 microns to 200 microns.

A light-absorbing composite layer 86 may be deposited into each gap 96 at stage 204. Preferably, the light-absorbing composite layer 86 comprises a metal selected for its high x-ray stopping power. Preferably, the metal is in the form of a powder with a particle size of from about 0.5 microns to about 5 microns. The light-absorbing composite layer 86 may further comprise a low viscosity polymer, such as an epoxy, polyurethane that acts as a binder for the metal powder. In such embodiments wherein the use of a low viscosity polymer is desired, from about 40% to about 60% by volume of the desired metal powder may be mixed with the liquid low viscosity polymer. The light-absorbing composite composition is then cast into gaps 96. After casting, the light-absorbing composite layer 86 may be allowed to cure.

One of ordinary skill in the art will appreciate that other methods may be used to deposit light-absorbing composite layer 86 between bi-layer reflectors 88. For example, the metal particles may be coated with an adhesive binder material such as a thermoplastic polymer coating. The coated metal particles would then be cast into the gaps 96 with a small amount of solvent, such as an alcohol. The solvent may then be vaporized, and the resultant dried material heated to melt the thermoplastic coating, thereby binding the metal particles together. Another method includes coating the metal particles with tungsten or with low temperature solder film. The solder film is then melted after the composition is cast into the gap. After the light absorbing composite is deposited by the desired method, the scintillator array is ground or milled on the top surface to remove any extra light absorbing composite and bi-layer reflector material.

Once the light-absorbing composite layer 86 interstitially disposed between bi-layer reflectors 88 has been allowed to cure, the scintillator array 56 is then machined at stage 205 to a final and desired dimension. Additionally, the bottom portion 99 of the scintillator substrate is machined or ground to remove extra scintillator and to attain a final and desired thickness. For example, depending on the type of scintillator being fabricated, the final thickness ranges from about 1.5 mm to about 3 mm. The machined surface may then be optically coupled to a photodiode in accordance with well-known CT detector fabrication assembly.

Figure 3:
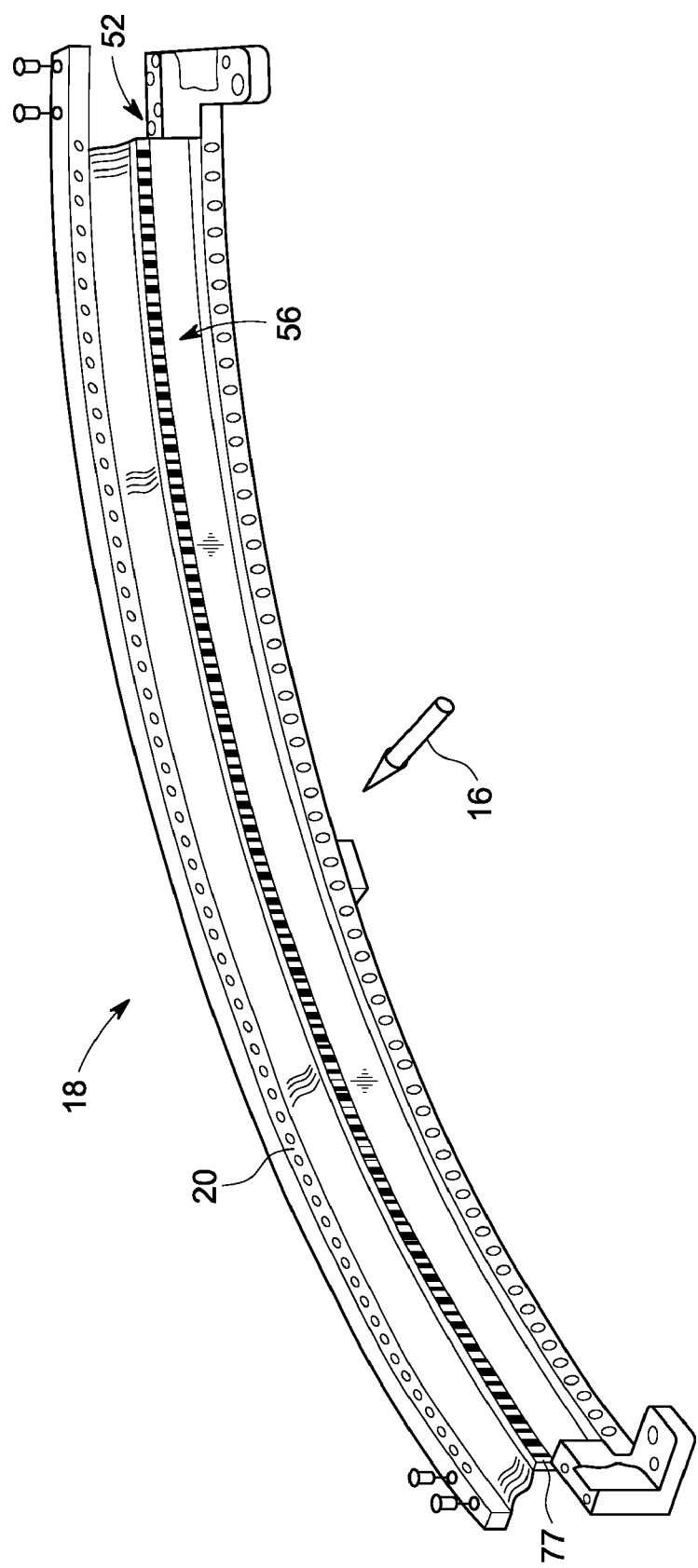
FIG. 3 is a perspective view of a CT system detector array comprising a scintillator array according to one embodiment.
Figure 4:
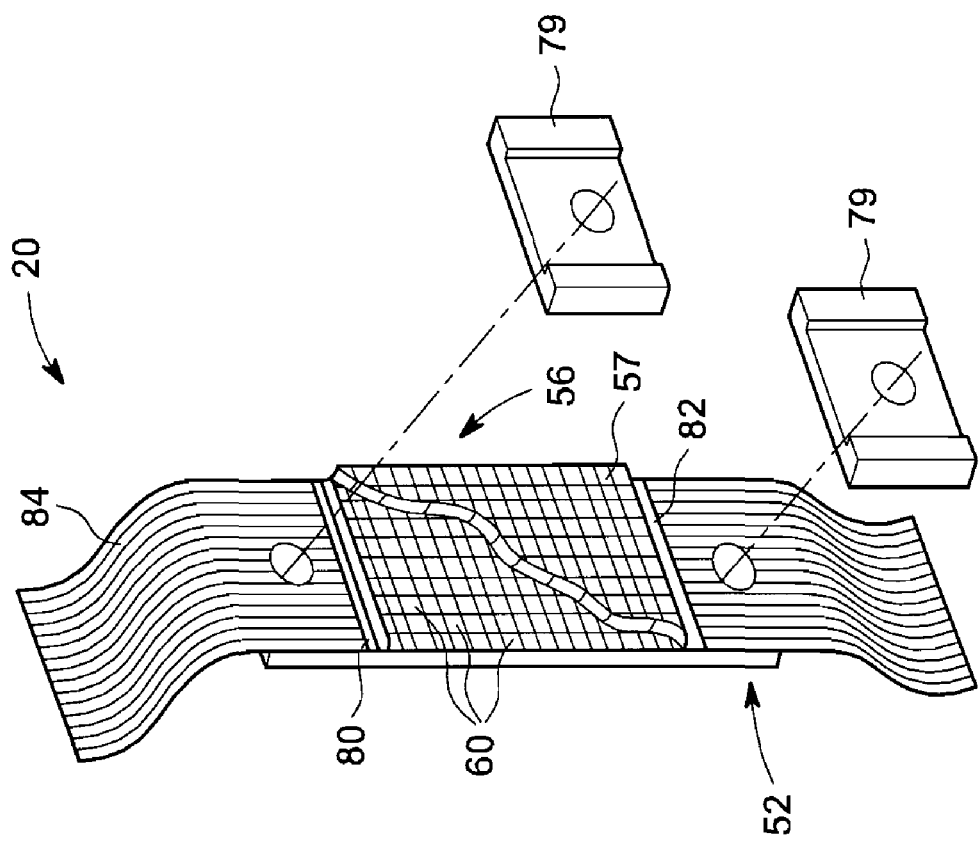
FIG. 4 is a perspective view of a detector in one embodiment of a scintillator array.

A detector array comprising the scintillator array is also provided. As shown in FIGS. 3 and 4, detector array 18 includes a plurality of scintillators 57 forming a scintillator array 56. A collimator (not shown is positioned above scintillator array 56 to collimate x-ray beams 16 before such beams impinge upon scintillator array 56.

FIG. 3 shows a detector array incorporating a scintillator array according to one embodiment. As shown in FIG. 3, detector array 18 includes 57 detectors 20, each detector 20 having an array size of 16×16. As a result array 18 has 16 rows and 912 columns (16×57 detectors) which allows 16 simultaneous slices of data to be collected with each rotation of detector array 18. FIG. 4 illustrates a detector 20. As shown in the cut-away detail of FIG. 4, the photodiodes 60 are formed as a substantially planar array, typically from a single silicon wafer. The scintillator array 56 is positioned and bonded to the photodiodes 60 by means of an optically transparent adhesive (not shown), with the uncoated face of the scintillators 57 aligned directly facing the matching array of photodiodes 60. In this manner, the light generated within each of the scintillators 57 is transmitted to a corresponding photodiode 60. It should be noted that each detector 20 has the approximate geometry of a rectangular prism, i.e., pairs of parallel, orthogonal, flat faces.

FIG. 3 illustrates a detector array 18. In order to form the curved geometry of the detector array, a plurality of detectors 20 are each secured to the detector frame 77 as adjacent chords of the arc defined by the detector frame 77. As shown in FIG. 3, the detectors 20 are mounted to the face of the detector frame having the larger radius of curvature (i.e., the rear face of the frame, as shown in FIG. 3).

Switch arrays 80 and 82, shown in FIG. 4, are multi-dimensional semiconductor arrays coupled between scintillator array 56 and a data acquisition system (not shown) operatively disposed relative to scintillator array 56. Switch arrays 80 and 82 include a plurality of field effect transistors (FETs) (not shown) arranged as a multi-dimensional array. The FET array includes a number of electrical leads connected to each of the respective photodiodes 60 and a number of output leads electrically connected to the data acquisition system via flexible electrical interface 84. More particularly, about one-half of photodiode outputs are electrically connected to switch array 80 with the other one-half of photodiode outputs electrically connected to switch array 82. Additionally, bi-layer reflector layer (not shown in FIGS. 3 and 4) is interposed between each scintillator 57 to reduce light scattering from adjacent scintillators. Each detector 20 is secured to a detector frame 77, FIG. 3, by mounting brackets 79.

Switch arrays 80 and 82 further include a decoder (not shown) that enables, disables, or combines photodiode outputs in accordance with a desired number of slices and slice resolutions for each slice. In some embodiments, the decoder may be a decoder chip or FET controller as known in the art. The decoder also includes a plurality of output and control lines coupled to switch arrays 80 and 82 and the data acquisition system. In one embodiment defined as a 16 slice mode, the decoder enables switch arrays 80 and 82 so that all rows of the photodiode array 52 are activated, resulting in 16 simultaneous slices of data for processing by the data acquisition system. Of course, many other slice combinations are possible. For example, the decoder may also select from other slice modes, including one, two, and four-slice modes.

Those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A scintillator array having a plurality of scintillators, further comprising:
   A reflecting unit interstitially disposed between at least two adjacent scintillators, the reflecting unit comprising:
      A light-absorbing composite disposed between a pair of bi-layer reflectors, the bi-layer reflectors comprising a conformal smoothing layer and a mirror layer, wherein the mirror layer comprises aluminum, and wherein the smoothing layer decreases a surface roughness of the scintillator.

2. The scintillator array of claim 1, where said smoothing layer comprises a low viscosity polymeric material.

3. The scintillator array of claim 2, wherein the smoothing layer comprises one or more of silicone hardcoats, styrene acrylate coatings, ultraviolet curable hardcoats, polyvinylidene chloride, epoxy silane hardcoats, phenolic or epoxide resins or combinations of these.

4. The scintillator array of claim 3, wherein the smoothing layer comprises an epoxy-silane hardcoat.

5. The scintillator array of claim 1, wherein the smoothing layer has a thickness of from about 0.5 to about 5 microns.

6. The scintillator array of claim 1, wherein the smoothing layer is transparent in the emissions wavelengths of the plurality of scintillators.

7. The scintillator array of claim 1, wherein the mirror layer comprises aluminum metal.

8. The scintillator array of claim 7, wherein the aluminum metal provides a minimum of 90% reflectivity in the range of from about 500 nm to about 70 nm.

9. The scintillator array of claim 1 wherein the mirror layer has a thickness of at least about 500 Angstroms.

10. The scintillator array of claim 9, wherein the mirror layer has a thickness of from about 2000-3000 Angstroms.

11. A scintillator array having a plurality of scintillators, further comprising:
    A reflecting unit interstitially disposed between at least two adjacent scintillators, the reflecting unit comprising:
       A light-absorbing composite interstitially disposed between a pair of bi-layer reflectors, the bi-layer reflectors comprising a conformal smoothing layer and a mirror layer, and wherein the bi-layer reflector does not comprise an intervening reducing agent or adhesion layer.

12. The scintillator array of claim 11, wherein the mirror layer comprises silver, gold, copper, rhodium, magnesium, aluminum, or combinations of these.

13. The scintillator array of claim 12, wherein the mirror layer comprises aluminum.

14. The scintillator array of claim 11, wherein the smoothing layer comprises an epoxy-silane hardcoat.

15. The scintillator array of claim 11, wherein the smoothing layer has a thickness of from about 0.5 to about 5 microns.

16. The scintillator array of claim 11, wherein the smoothing layer is transparent in the emissions wavelengths of the plurality of scintillators.

17. A method of forming a bi-layer reflector on a plurality of three-dimensional scintillators comprising:
    Applying a conformal smoothing layer to the three-dimensional scintillators;
    Applying a mirror layer directly to the conformal smoothing layer;
    Removing a top surface of the scintillator array; and
    Applying a light-absorbing composite.

18. The method of claim 17, wherein the smoothing layer is applied using a wet chemistry method.

19. The method of claim 18, wherein the smoothing layer is applied using a solution flow coat method.

20. The method of claim 17, wherein the mirror layer is applied using a non-line of sight process.

21. The method of claim 20, wherein the mirror layer is applied using gas phase metallization.

22. A detector array comprising:
    A scintillator array having a plurality of scintillators, the scintillator array further comprising a light-absorbing composite disposed between a pair of bi-layer reflectors, the bi-layer reflector comprising a conformal smoothing layer and a mirror layer, wherein the mirror layer comprises aluminum; and
    A plurality of detectors.

23. The detector array of claim 22, further comprising a plurality of switch arrays.

* * * * *